United States Patent
Branson et al.

(10) Patent No.: US 9,566,518 B2
(45) Date of Patent: *Feb. 14, 2017

(54) AUDIO ARTIST AVATARS IN A VIRTUAL ENVIRONMENT

(71) Applicant: International Business Machines Corporation, Armonk, NY (US)

(72) Inventors: Michael J. Branson, Rochester, MN (US); Gregory R. Hintermeister, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 380 days.

This patent is subject to a terminal disclaimer.

(21) Appl. No.: 14/255,486

(22) Filed: Apr. 17, 2014

(65) Prior Publication Data

US 2015/0246285 A1    Sep. 3, 2015

Related U.S. Application Data

(63) Continuation of application No. 14/195,164, filed on Mar. 3, 2014.

(51) Int. Cl.

| | |
|---|---|
| *A63F 13/00* | (2014.01) |
| *A63F 9/24* | (2006.01) |
| *A63F 13/537* | (2014.01) |
| *A63F 13/56* | (2014.01) |
| *A63F 13/424* | (2014.01) |

(52) U.S. Cl.
CPC .......... *A63F 13/537* (2014.09); *A63F 13/424* (2014.09); *A63F 13/56* (2014.09)

(58) Field of Classification Search
CPC .......... A63F 13/57; A63F 13/58; A63F 13/56; A63F 13/537; A63F 13/424
USPC .......................................................... 463/1
See application file for complete search history.

(56) References Cited

U.S. PATENT DOCUMENTS

| | | | |
|---|---|---|---|
| 6,466,213 B2 | 10/2002 | Bickmore et al. | |
| 2004/0235564 A1* | 11/2004 | Booth | A63F 13/12 463/31 |
| 2008/0250315 A1 | 10/2008 | Eronen et al. | |
| 2009/0106673 A1* | 4/2009 | Jung | G06Q 30/06 715/757 |
| 2010/0017260 A1 | 1/2010 | Hamilton, II et al. | |

(Continued)

OTHER PUBLICATIONS

Phillips, Stephen, "Now playing: Twitter #music", Apr. 18, 2013, retrieved from URL <https://blog.twitter.com/2013/now-playing-twitter-music>.*

*Primary Examiner* — Jason Skaarup
*Assistant Examiner* — Ryan Hsu
(74) *Attorney, Agent, or Firm* — Patterson + Sheridan, LLP

(57) ABSTRACT

Techniques are disclosed to reflect status in a virtual environment. An artist associated with audio content being played by a first user controlling a player avatar is determined. A companion avatar providing a virtual representation of the artist of the audio content is generated. The companion avatar is associated with the player avatar in the virtual environment. The companion avatar is configured to interact with the player avatar, and presence of the companion avatar conveys to one or more other users interacting within the virtual environment that the first user is currently listening to audio content of the artist.

20 Claims, 8 Drawing Sheets

(56) References Cited

U.S. PATENT DOCUMENTS

2010/0083139 A1* 4/2010 Dawson ............... A63F 13/12
　　　　　　　　　　　　　　　　　　　715/757
2014/0096036 A1* 4/2014 Mohler ............... G06Q 10/10
　　　　　　　　　　　　　　　　　　　715/753

* cited by examiner

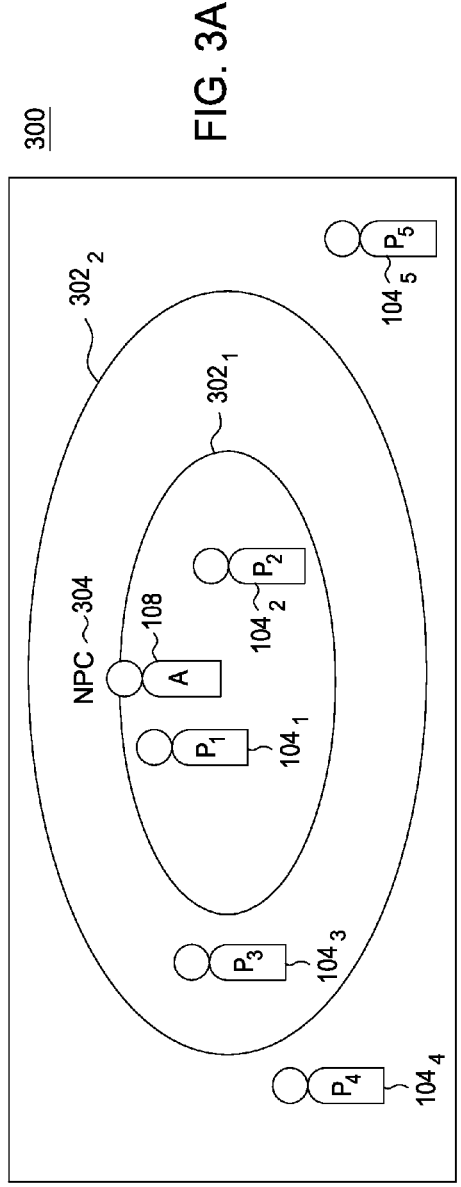

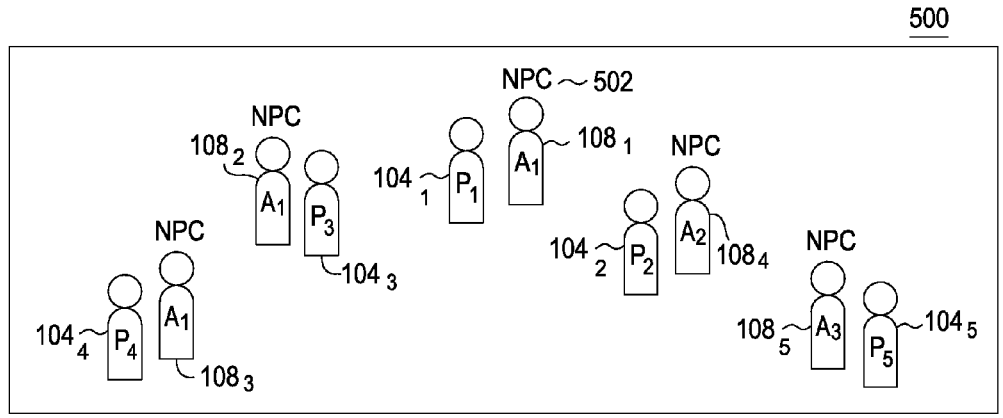
FIG. 5A
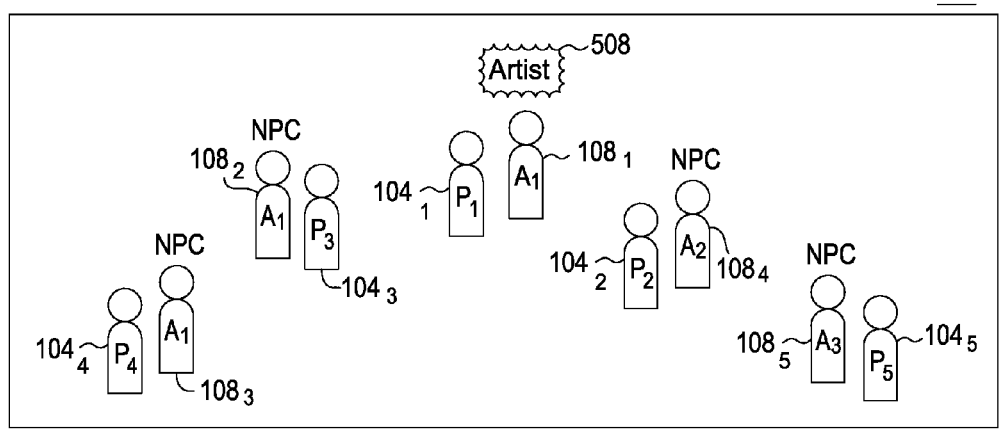
FIG. 5B
FIG. 5C

AUDIO ARTIST AVATARS IN A VIRTUAL ENVIRONMENT

CROSS-REFERENCE TO RELATED APPLICATIONS

This application is a continuation of co-pending U.S. patent application Ser. No. 14/195,164, filed Mar. 3, 2014. The aforementioned related patent application is herein incorporated by reference in its entirety.

BACKGROUND

Field

Embodiments disclosed herein relate to virtual environments. More specifically, embodiments disclosed herein relate to reflecting status in a virtual environment.

Description of the Related Art

A virtual world is a simulated environment in which users may interact with virtual objects and locations of the virtual world. Each user may control a respective avatar through which the user may interact with other users' avatars in the virtual world. An avatar generally provides a graphical representation of an individual within the virtual world environment. Avatars are usually presented to other users as two or three-dimensional graphical representations that resembles a human individual. Frequently, virtual worlds allow multiple users to enter the virtual environment and interact with one another. Virtual worlds are said to provide an immersive environment, as they typically appear similar to the real world and objects tend to follow rules related to gravity, topography, locomotion, physics and kinematics. Of course, virtual worlds can suspend or alter these rules as well as provide other imaginative or fanciful environments. Users typically communicate with one another through their avatars using text messages sent between avatars, real-time voice communication, gestures displayed by avatars, symbols visible in the virtual world, and the like.

Some virtual worlds are described as being persistent. A persistent world provides an immersive environment (e.g., a fantasy setting used as a setting for a role-playing game, or a virtual world complete with land, buildings, towns, and economies) that is generally always available and where events continue to occur regardless of the presence of a given avatar. Thus, unlike more conventional online games or multi-user environments, the virtual world continues to exist and plots and events continue to unfold as users enter (and exit) the virtual world. Other virtual worlds are persistent for a certain period of time, e.g., a specified number of days. Virtual environments are presented as images on a display screen and some virtual environment may allow users to record events that occur within the virtual environment.

SUMMARY

Embodiments presented in this disclosure provide a computer-implemented method to reflect status in a virtual environment. The method includes determining an artist associated with audio content being played by a first user controlling a player avatar in the virtual environment. The method also includes generating a companion avatar providing a virtual representation of the artist of the audio content. The method also includes associating the companion avatar with the player avatar in the virtual environment. The companion avatar is configured to interact with the player avatar, and presence of the companion avatar conveys to one or more other users interacting within the virtual environment that the first user is currently listening to audio content of the artist.

Other embodiments presented in this disclosure provide a computer program product to reflect status in a virtual environment. The computer program product includes a computer-readable storage medium having program code embodied therewith, the program code executable to determine an artist associated with audio content being played by a first user controlling a player avatar in the virtual environment. The program code is also executable to generate a companion avatar providing a virtual representation of the artist of the audio content. The program code is also executable to associate the companion avatar with the player avatar in the virtual environment. The companion avatar is configured to interact with the player avatar, and presence of the companion avatar conveys to one or more other users interacting within the virtual environment that the first user is currently listening to audio content of the artist.

Still other embodiments presented in this disclosure provide a system to reflect status in a virtual environment. The system includes one or more computer processors and a memory containing a program which, when executed by the one or more computer processors, is configured to perform an operation that includes determining an artist associated with audio content being played by a first user controlling a player avatar in the virtual environment. The operation also includes generating a companion avatar providing a virtual representation of the artist of the audio content. The operation also includes associating the companion avatar with the player avatar in the virtual environment. The companion avatar is configured to interact with the player avatar, and presence of the companion avatar conveys to one or more other users interacting within the virtual environment that the first user is currently listening to audio content of the artist.

BRIEF DESCRIPTION OF THE SEVERAL VIEWS OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIGS. 3A-3B convey perks granted by the companion avatar in a first avatar mode, according to one embodiment presented in this disclosure.

FIGS. 5A-5C depict a user interface for an artist to take control of a companion avatar, according to one embodiment presented in this disclosure.

DETAILED DESCRIPTION

Virtual environments seek to provide an engaging, immersive experience for its users. Some virtual environments may also encourage social activity, such as providing incentives for users to band together to complete a desired objective. Virtual environments may also provide audio content for playback by the users. However, some users may opt to play back audio content that is not provided by the virtual environment, e.g., content from a private playlist. For instance, users may disable background audio tracks of the virtual environment and use an external media player application to play back desired audio content. The media player application may run locally on a computer system of the user along with the applications that provide the virtual environment.

Some embodiments herein provide techniques to integrate the audio experience provided by user-selected audio content with the immersive experience provided by virtual environment. Doing so provides additional ways to interact with the virtual environment. At least in some cases, other users in the virtual world may also expand how they interact with the virtual environment, regardless of the audio content other users are listening to. In some embodiments, an artist associated with the audio content may participate in the virtual environment to interact with fans and to share, promote, or sell content. To that end, an avatar representing the artist may be presented near users currently listening to audio content by the artist. Presence of the avatar representing the artist thus conveys or reflects a status of one or more users of the virtual environment, e.g., in terms of audio content that the users are currently listening to.

In one embodiment, a virtual world application may be configured to identify audio content played back by a user having a player avatar in the virtual environment. The virtual world application then identifies an artist of the audio content. The virtual world then generates an artist avatar that represents the identified artist. The artist avatar serves as a companion for at least the user in the virtual environment. The artist avatar may also be referred to herein as a companion avatar.

Figure 1:
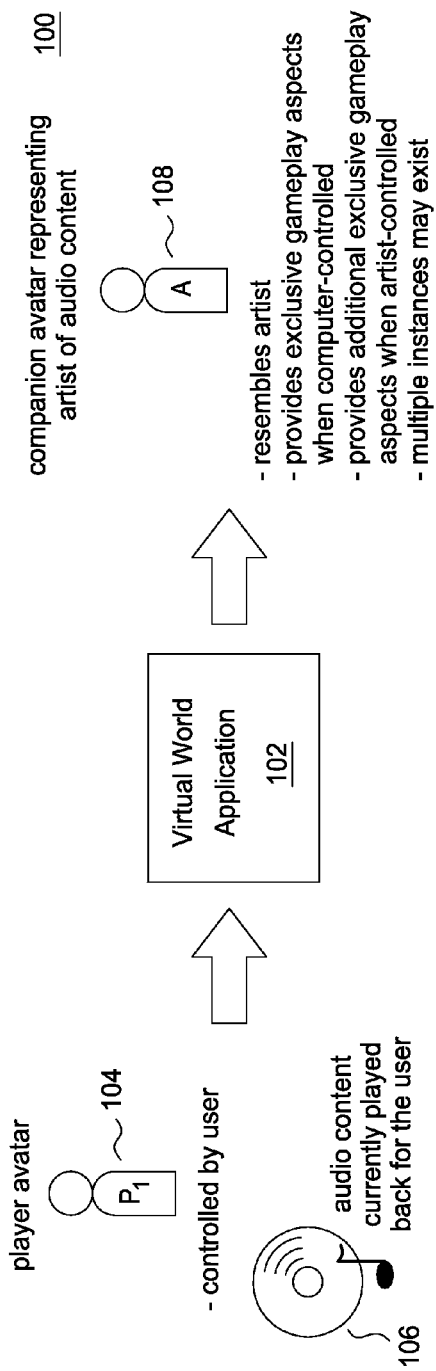
FIG. 1 is a data flow diagram illustrating an application configured to reflect status in a virtual environment, according to one embodiment presented in this disclosure.

FIG. 1 is a data flow diagram 100 illustrating an application configured to reflect status in a virtual environment, according to one embodiment presented in this disclosure. As shown, a virtual world application 102 is configured to identify audio content 106 currently being played back by a user of a player avatar 104 in the virtual environment. The virtual world application 102 is also configured to identify an artist of the audio content currently played back by the user. The virtual world application 102 is also configured to generate a companion avatar 108 representing the identified artist. At least in some embodiments, the companion avatar 108 resembles the identified artist at least in part.

In some embodiments, the companion avatar 108 may have different modes including a non-player character (NPC) mode and an artist mode. In the non-player character mode, the companion avatar 108 is computer-controlled without requiring user input, while in the artist mode, the companion avatar 108 is controlled in real-time based on input from the artist. Depending on the embodiment, the authorization and/or authentication process for artists may be the same as or different from those for non-artist users. Regardless of the mode the companion avatar 108 is in, the companion avatar 108 may be equipped with abilities that may assist the player avatar 104 in completing one or more objectives defined in the virtual environment. These abilities may be offensive in nature, defensive in nature, or provided other utility to the player avatar 104. Further, each artist may be represented by a companion avatar with a distinct set of abilities specific to the respective artist. Further still, each companion avatar may have a distinct set of animations specific to the companion avatar, including, for example, spawning animation, movement animation, attack animation, death animation, etc.

In some embodiments, the companion avatar 108 may additionally or alternatively provide predefined commentary pertaining to various aspects such as pertaining to the audio content being played back by the user, pertaining to the artist, pertaining to the virtual environment, pertaining to the current location of the companion avatar 108 in the virtual environment, and so forth. For instance, commentary may indicate when or how the artist composed or performed the audio content being played, the inspiration behind the audio content, etc. Depending on the embodiment, the commentary may be provided to the user by text, audio, video, or a combination thereof. Depending on the embodiment, audio or video commentary may be provided based on a recording or footage of the artist prepared ahead of time, or based on at least a text-to-speech convertor. Doing so allows the artist to provide users with behind-the-scenes content at least in some cases. In some embodiments, certain portions of the commentary may be synchronized in time to certain sections of the audio content being played back by the user, based on one or more predefined commentary synchronization rules specific to the audio content being played back.

In one embodiment, the companion avatar 108 when in NPC mode conforms to movement constraints pertaining to its location relative to the player avatar 104. For instance, the movement constraint may preclude the companion avatar 108 in NPC mode from straying beyond a predefined travel distance from the player avatar 104 in the virtual environment. At least in some embodiments, the movement constraints may be determined and/or modified based at least in part on input from the user of the player avatar 104. In some embodiments, the movement constraints may be freely disregarded when the companion avatar 108 is in artist mode.

In some embodiments, when the companion avatar 108 is in NPC mode, exclusive cosmetic and/or gameplay aspects may be provided in the virtual environment. When the companion avatar 108 is in artist mode, additional exclusive cosmetic and/or gameplay aspects may be provided in the virtual environment. Further, for each artist, multiple instances of the companion avatar in NPC mode may coexist in the virtual environment. This allows multiple player avatars in the virtual environment to have the same companion avatar. In some embodiments, for each artist, only a single instance of the corresponding companion avatar in artist mode may coexist in the virtual environment. For each artist, however, a corresponding companion avatar in artist mode may coexist with multiple corresponding companion avatars in NPC mode. In some embodiments, the artist may alternate, in sequence, control of multiple companion avatar instances, effectively "hopping" from one instance to another in the virtual environment.

Figure 2:
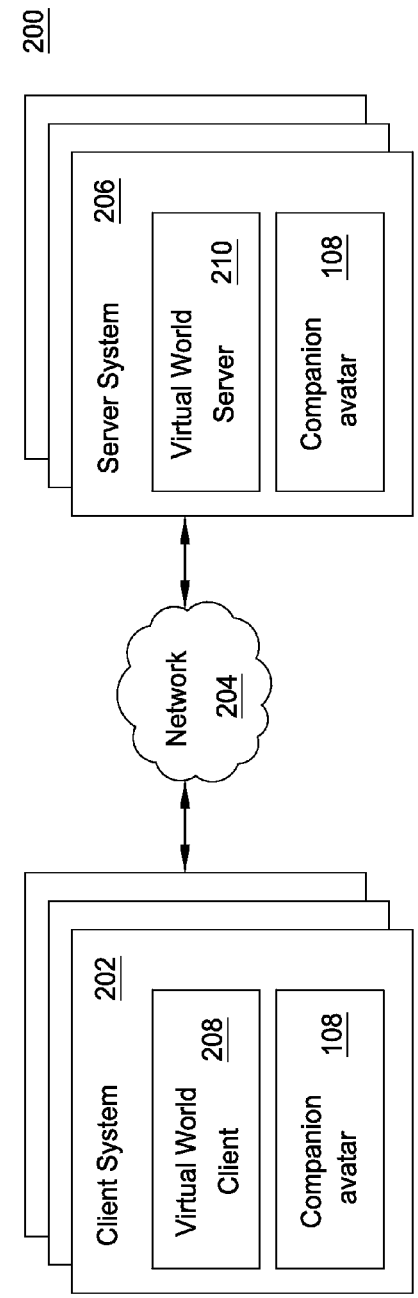
FIG. 2 is a block diagram illustrating a networked system configured to reflect status in a virtual environment, according to one embodiment presented in this disclosure.

FIG. 2 is a block diagram illustrating a networked system 200 configured to reflect status in a virtual environment, according to one embodiment presented in this disclosure. As shown, the system 200 includes a plurality of client systems 202 connected to a plurality of server systems 206 via a network 204. Depending on the embodiment, the virtual world application 102 may be one or more of a virtual world client 208 or a virtual world server 210. In one embodiment, each of the client systems 202 is configured to operate the virtual world client 208. Examples of the client systems 202 include, without limitation, console gaming systems (e.g., the Microsoft Xbox 360®, the Sony Playstation® 3, etc.), handheld gaming systems (e.g., the Nintendo 3DS™ and DS™, the Sony PSP®, etc.), personal computer gaming systems and so on. The server systems 206 are configured to operate the virtual world server 210. Generally, the virtual world server 210 is configured to receive connections from users (e.g., via the virtual world clients 208) and to manage a virtual environment and interactions between the users within the virtual environment. In one embodiment, the virtual environment is a virtual world. The virtual world client 208 or the virtual world server 210 may provide the companion avatar 108 for the a player avatar in the virtual environment. Doing so may facilitate social interaction and improve immersive aspects of the virtual environment at least in some cases.

FIGS. 3A-3B depict a graphical user interface (GUI) screen 300 of the virtual world application 102 and showing a companion avatar 108 in NPC mode, along with an accompanying table 350 of effects permitted by the companion avatar 108 in NPC mode, according to one embodiment presented in this disclosure. Depending on the embodiment, the effects may include cosmetic effects, gameplay effects, or hybrid effects. Cosmetic effects serve a cosmetic purpose and do not alter the ability of any player avatar to achieve any predefined objective in the virtual environment. An example of a cosmetic effect is a pair of virtual boots for the player avatar in the virtual environment. In contrast, gameplay effects alter the ability of a player avatar to achieve a predefined objective in the virtual environment and do not provide any cosmetic aspect beyond what is needed to realize the gameplay effect. An example of a gameplay effect is an enhanced jumping ability of the player avatar in the virtual environment. Hybrid effects are effects that combine cosmetic effects and gameplay effects. An example of a hybrid effect is a pair of virtual boots that, when worn, gives the player avatar enhanced jumping ability. The effects may be referred to herein as aspects or perks.

As shown, the GUI screen 300 shows player avatars $104_{1-5}$ at a predefined location in the virtual environment. Assume that a user of the player avatar $104_1$ is currently playing back audio content. As stated above, in one embodiment, the virtual world application 102 identifies an artist of the audio content. Depending on the embodiment, the artist may be identified based on metadata of the audio content, digital audio fingerprinting techniques, etc. The virtual world application 102 then generates a companion avatar 108 for the player avatar $104_1$ and representing the identified artist. The companion avatar 108 includes a mode indicator 304 indicating the current mode of the companion avatar 108. In this particular example, the mode indicator 304 indicates that the companion avatar 108 is in NPC mode. In alternative embodiments, the companion avatar 108 may additionally include an artist name indicator indicating a name of the artist and/or a player name indicator indicating a player name of a player avatar that the companion avatar 108 is a companion to.

At least in some embodiments, the artist is generated by instantiating a predefined avatar template for the artist, wherein the predefined avatar template is selected from a set of predefined avatar templates representing various artists. Each predefined avatar template bears at least some physical resemblance of the respective artist, including physical features, preferred style of attire, accessories, instruments, etc. Depending on the embodiment, the predefined avatar template for a given artist may be generated based at least in part on input from the artist or without requiring any input whatsoever from the artist. In some scenarios where the artist is identified but where no predefined avatar representing the artist is available, the virtual world application 102 generates a first generic avatar having an artist name indicator indicating the name of the identified artist. In other scenarios where the artist cannot be identified by the virtual world application 102, the virtual world application 102 generates a second generic avatar having an artist name indicator indicating an artist name provided by the user of the player avatar $104_1$. Depending on the embodiment, the first and second generic avatars may be the same or different in physical appearance in the virtual world.

In one embodiment, the companion avatar 108 may be introduced into the virtual world in NPC mode. Presence of the companion avatar 108 in the NPC mode may grant eligible players one or more of a set of perks associated with the NPC mode of companion avatar 108. Each perk may have associated eligibility criteria for receiving the respective perk. The eligibility criteria may pertain to aspects related to the player avatar or to the user of the player avatar. For instance, a given perk may only be available to the player avatar that the companion avatar is companion to. Another perk may require eligible player avatars to be within a predefined range of the companion avatar 108 in the virtual environment. Additionally or alternatively, the perk may require eligible player avatars to have completed a predefined objective in the virtual environment, such as having obtained the requisite amount of experience points to achieve a designated player avatar level. Still additionally or alternatively, the perk may require the users of eligible player avatars to geographically reside in a given state or city in the United States, as evidenced in user account information associated with the player avatars and previously specified by the users. The perk may also require the users of eligible player avatars to have purchased a given number of audio content items of the artist, as evidenced by purchase transaction histories or personal audio library metadata associated with the users.

As shown in the table 350 of effects, NPC-mode perks in a particular embodiment include perks 306 of a speed boost, a spell cast, and a drop rate bonus. The speed boost increases the maximum moving speed of a player avatar and is available only to the player avatar that the companion avatar 108 is companion to. The spell cast permits a player avatar to cast a spell associated with the artist and is available to any player avatar within a first area $302_1$ of effect associated with the companion avatar 108. Depending on the embodiment, the spell may be serve offensive, defensive, or other purposes in the virtual environment. The drop rate bonus increases an enemy drop rate of a virtual item associated with the artist and is available to any player avatar within a second, larger area $302_2$ of effect associated with the companion avatar 108. The enemy drop rate of a given virtual item from a given virtual foe is a percentage chance of the virtual foe dropping the virtual item as a player reward, when the virtual foe is defeated by the player.

Depending on the embodiment, the areas 302 of effect may be measured as a function of a current location of the companion avatar 108, of the player avatar $104_1$, and/or a virtual object of the companion avatar 108, etc. At least in some embodiments, the areas 302 of effect are visually conveyed in the virtual environment in the form of halos of a predefined color and/or texture. In an alternative embodiment, the areas 302 of effect are not visually conveyed in the virtual environment. In some embodiments, in addition to or in lieu of the proximity to the companion avatar, eligibility of a given player avatar to receive a perk may hinge on whether the given player avatar is in the same guild, clan, team, squad, or party as the player avatar having the companion avatar or whether the given player avatar is currently on a friend list of the player avatar in the virtual environment.

As shown, in the presence of the companion avatar 108 in NPC mode in the virtual environment, the player avatar $104_1$ receives all three perks, including the speed boost, the spell cast, and the drop rate bonus. The player avatar $104_2$ receives two perks including the spell cast and the drop rate bonus. The player avatar $104_3$ receives only the drop rate bonus perk. The player avatars $104_{4-5}$, on the other hand, do not receive any of the three perks associated with the companion avatar 108 in NPC mode. In some embodiments, the perks may also scale with the count of proximate player avatars. For instance, the effect of the spell cast may be increased based on the total number of player avatars within the first area $302_1$ of effect. Similarly, the drop rate bonus may be increased based on the total number of player avatars within the second area $302_2$ of effect. In other embodiments, the perks do not scale with the count of proximate player avatars.

In some embodiments, the perks may additionally or alternatively scale based on proximity to the companion avatar, amount of audio tracks of the artist owned by the user of the player avatar, etc. In a particular embodiment, any player avatar may request and receive a special weapon from the companion avatar. The larger the collection of audio content owned by the user of a given player avatar wielding the special weapon, the more powerful the attributes of the special weapon. Similarly, in another particular embodiment, any player avatar may request and receive special armor from the companion avatar. The larger the collection of audio content owned by the user of a given player avatar wearing the special armor, the more powerful the attributes of the special armor. In yet another embodiment, any player avatar may request and receive one or more "magic spells" from the companion avatar. The larger the collection of audio content owned by the user of a given player avatar using the magic spells, the more powerful the effects of the magic spells. Still another embodiment includes receiving a positive status effect or "buff" that is scaled based on the collection size of the user of a given player avatar. Other embodiments not departing from the scope of the present disclosure are broadly completed.

In one embodiment, the companion avatar 108 spawns in the virtual environment once the player avatar $104_1$ plays back audio content of the artist for a first predefined duration of time. At least in some embodiments, the companion avatar 108 de-spawns in the virtual environment once the player avatar $104_1$ has stopped playing back audio content of the artist for a second predefined duration of time. Depending on the embodiment, the first and second durations of time may be the same or different in measure. Further, depending on the embodiment, a single player avatar may be precluded from having or permitted to have multiple concurrent companion avatars. Multiple concurrent artist avatars may be present, for example, when a new companion avatar has spawned and before the old companion avatar has de-spawned, based on the first and second durations of time discussed above. In embodiments where a given artist is an artist group, one or more avatars representing one or more members of the artist group may spawn.

Figures 4A, 4B:
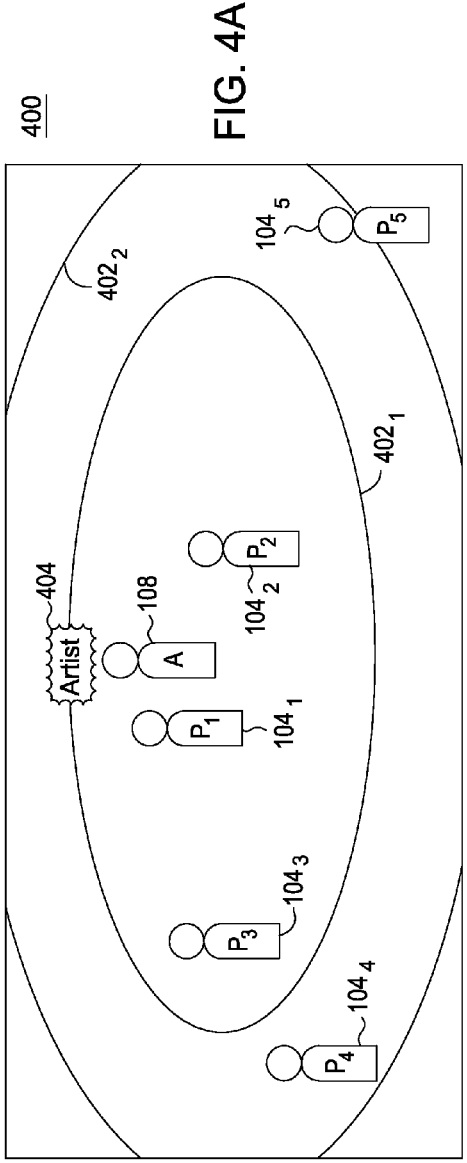
FIGS. 4A-4B convey perks granted by the companion avatar in a second avatar mode, according to one embodiment presented in this disclosure.

FIGS. 4A-4B depict a GUI screen 400 of the virtual world application 102 and showing a companion avatar 108 in artist mode, along with an accompanying table 450 of effects permitted by the companion avatar 108 in artist mode, according to one embodiment presented in this disclosure. As stated above, in some embodiments, an artist may be permitted to control a companion avatar representing the artist in the virtual world. When the artist takes control of the companion avatar, the companion avatar switches from NPC mode to artist mode. Put another way, the companion avatar is re-introduced into the virtual world in artist mode rather than in NPC mode. As shown, the companion avatar 108 includes a mode indicator 404 indicating that the current mode of the companion avatar 108 is artist mode rather than NPC mode. At least in some embodiments, the mode indicator 404 is conveyed more prominently than the mode indicator 304 of FIG. 3. In some embodiments, in addition to or alternative to the mode indicator 404, users may identify the companion avatar 108 as being in artist mode, on the basis of the companion avatar 108 initiating or engaging in textual or aural conversation with one or more players and in a manner that the companion avatar 108 in NPC mode is not configured to support.

In some embodiments, the companion avatar when in artist mode provides a different set of perks in addition to also providing the perks of the companion avatar from NPC mode. In some embodiments, the perks of the companion avatar from NPC mode may also be increased in measure when the companion avatar is in artist mode. In alternative embodiments, the companion avatar when in artist mode only provides the different set of perks, to the exclusion of the perks of the companion avatar from NPC mode. In still alternative embodiments, the companion avatar when in artist mode provides the same perks as provided by the companion avatar from NPC mode, and the perks may be increased or may remain the same in measure.

In one embodiment, the specific perks associated with the NPC mode and the artist mode of the companion avatar, respectively, may be determined based at least in part on input from the user of the player avatar, the artist, a developer of the virtual world application 102, and/or a provider of servers hosting the virtual environment. At least in some embodiments, the specific perks associated with the NPC mode and the artist mode, respectively, may be selected from a greater number of perks associated with and unique to the artist. The greater number of perks may also be determined based at least in part on input from the user of the player avatar, the artist, a developer of the virtual world application 102, and/or the server provider. At least in some embodiments, the perks associated with a companion avatar instance may be determined based on a predefined function such as a pseudorandom function.

In one embodiment, the abilities of the companion avatar itself may also be determined based at least in part on input from the user of the player avatar, the artist, a developer of the virtual world application 102, and/or a provider of servers hosting the virtual environment. At least in some embodiments, the specific abilities associated with the companion avatar may be selected from a greater number of abilities associated with and unique to the artist. The greater number of abilities may also be determined based at least in part on input from the user of the player avatar, the artist, a developer of the virtual world application 102, and/or the server provider. At least in some embodiments, the abilities associated with a companion avatar instance may be determined based on a predefined function such as a pseudorandom function.

As shown in the table 450 of effects, artist-mode perks in a particular embodiment include perks 406 of purchasing an exclusive t-shirt, purchasing an exclusive audio track, and streaming an exclusive audio track. An alternative embodiment provides an artist-mode perk of providing a discount on a non-exclusive audio track or album or even a giveaway of a non-exclusive audio track or album. Non-exclusive or discounted audio tracks may be visually conveyed in the virtual world as virtual jewel cases held by the companion avatar, inside coat pockets of the companion avatar, in a cart pushed by the companion avatar, etc. In some embodiments, audio tracks already owned by a given user is determined by, upon approval by the user, inventorying an audio library of the user, which in some cases may be maintained by a media player application of the user. The companion avatar may then offer, for sale to the user, only those tracks not already owned by the user, thereby reducing user interface clutter at least in some cases. In a specific embodiment, the companion avatar may give a virtual jewel case to the player avatar in the virtual environment, and the user of the player avatar may complete the trade or transaction by having the player avatar place the virtual jewel case in a pocket of the player avatar.

Depending on the embodiment, the t-shirt may be a real-world t-shirt for the user of the player avatar or a virtual t-shirt for the player avatar, and the purchased audio track may be the same as or different than the streamed audio track. In one embodiment, the perk of purchasing the exclusive t-shirt permits a user of an eligible player avatar to purchase an exclusive t-shirt associated with the artist and is available only to the player avatar that the companion avatar 108 is companion to. The perk of purchasing an exclusive audio track permits a user of an eligible player avatar to purchase an exclusive audio track from the artist and is available to any player avatar within a first area $402_1$ of effect associated with the companion avatar 108. The perk of streaming an exclusive audio track permits a user of an eligible player avatar to listen to the exclusive audio track and is available to any player avatar within a second area $402_2$ of effect associated with the companion avatar 108. Put another way, in some embodiments, the virtual world application 102 is configured to preclude users of ineligible player avatars from purchasing the exclusive t-shirt, purchasing the exclusive audio track, and streaming the exclusive audio track, as appropriate.

As shown, the areas $402_{1-2}$ of effect in FIG. 4 are expanded relative to the areas $302_{1-2}$ of effect in FIG. 3. In some embodiments, when the companion avatar 108 is in artist mode, both artist-mode perks and NPC-mode perks are provided based on the expanded areas $402_{1-2}$ of effect. In alternative embodiments, when the companion avatar 108 is in artist mode, artist-mode perks are provided based on the expanded areas $402_{1-2}$ of effect, while NPC-mode perks are provided based on the original areas $302_{1-2}$ of effect.

As shown, in the presence of the companion avatar 108 in artist mode in the virtual environment, the player avatar $104_1$ receives all three perks, including the abilities to purchase an exclusive t-shirt, to purchase an exclusive audio track, and to stream an exclusive audio track, respectively. The player avatars $104_{2-3}$ each receives two perks including the abilities to purchase an exclusive audio track and to stream an exclusive audio track, respectively. The player avatar $104_4$ receives only the ability to stream an exclusive audio track. The player avatars $104_5$, on the other hand, does not receive any of the three perks associated with the companion avatar 108 in artist mode. As stated above, at least in some embodiments, both artist-mode perks and NPC-mode perks may be simultaneously active when the companion avatar 108 is in artist mode.

FIGS. 5A-5C depict GUI screens 500, 520, 580 of the virtual world application and pertaining to the companion avatar 108 in artist mode, according to one embodiment presented in this disclosure. As stated above, in some embodiments, the virtual world application may permit an actual artist to control, in successive, companion avatar instances representing the artist. As shown in the GUI screen 500, the virtual environment includes player avatars $104_{1-5}$ each having a respective companion avatar $108_{1-3}$ representing an artist of audio content currently played back by the user of the respective player avatar 104. More specifically, the player avatars $104_{1,3-4}$ have companion avatars $108_{1-3}$ representing the same (first) artist. The player avatar $104_2$ has a companion avatar $108_4$ representing a second artist, and the player avatar $104_5$ has a companion avatar $108_5$ representing yet a third artist. Each companion avatar $108_{1-5}$ is in NPC mode, as indicated by the mode indicator 502 of the companion avatar $108_1$, for example.

Assume that the first artist launches the virtual world application 102 and logs into a player account specifically designated as an artist account. In this regard, the registration process for an artist account may include verification of the purported identity of the user claiming to be the artist. The virtual world application 102 may then present the GUI screen 520 to the artist. As shown, the GUI screen 520 provides a listing 504 of existing instances of the companion avatar representing the artist in the virtual environment. At least in some embodiments, the GUI screen 520 permits the artist to select, in succession, one or more of the listed instances to control. Controlling an instance by an artist may also be referred to herein as populating the instance by the artist, inhabiting the instance by the artist, or a special appearance made by the artist via the instance. At least in some embodiments, although the GUI screen 520 is provided to the artist, the artist is not compelled to use any of the features provided by the GUI screen 520. In particular, if the artist merely desires to enjoy the virtual environment using a player avatar of the artist, the artist may do so. On the other hand, players who are not recognized by the virtual world application 102 as artists are precluded from accessing the GUI screen 520. Similarly, artists who have not properly created a player account designated as an artist account are also precluded from accessing the GUI screen 520.

As shown, the listing includes an entry for each of the companion avatars $108_{1-3}$, which represent the first artist. A first entry specifies that one instance is companion to the player avatar $104_1$ having an avatar level of eight, an associated player named Amy Brown, aged nineteen, residing in the United States, and who owns fifteen out of twenty audio tracks of the artist. A second entry specifies that another instance is companion to the player avatar $104_3$ having an avatar level of ten and an associated player named Bob Smith, aged twenty-six, residing in Canada, and who owns twelve out of twenty audio tracks of the artist. A third entry specifies that yet another instance is companion to the player avatar $104_4$ having an avatar level of five and an associated player named Chris White, aged twenty-two, residing in the United States, and who owns five out of twenty audio tracks of the artist. In some embodiments, other attributes are shown, such as a current location of the companion avatar or of the player avatar in the virtual environment. In some embodiments, the current location of the virtual environment is graphically shown in the GUI screen 520 in real-time, including all avatars and virtual objects at the current location.

In one embodiment, the GUI screen 520 also includes a set of commands 506 available to the artist. As shown, the commands 506 include refresh, auto-select, show all players, populate selected companion, and specify duration. The refresh command permits the artist to refresh the listing 504 to show a latest set of companion avatars that exist in the virtual environment. In an alternative embodiment, the listing 504 refreshes automatically and periodically, and the refresh command is optionally provided. The auto-select button permits the artist to request the virtual world application 102 to automatically select a companion avatar instance based on one or more predefined selection rules. In a particular embodiment, the selection rules may specify that users owning more audio tracks of the artist have a higher likelihood of selection and that younger have a higher likelihood of selection. The selection rules may be tailored to suit the needs of a particular case.

In one embodiment, the show all players command permits the artist to specify to augment the listing to include other types of players not already displayed. For example, the listing may be augmented to display players who are not currently listening to the audio content by the artist but who nevertheless own greater than a predefined minimum threshold of audio tracks of the artist. Additionally or alternatively, in embodiments where players whose companion avatar instances have recently been inhabited by the artist are not included in the listing, the listing may be augmented to nonetheless display such players. The populate selected companion permits the artist to specify to populate a companion avatar instance, once the companion avatar instance is selected by the artist or automatically selected by the virtual world application 102. The specify duration command permits the artist to specify a minimum and/or a maximum duration for which to inhabit each individual companion avatar instance. In some embodiments, the artist is precluded from inhabiting a companion avatar instance for a duration shorter than the minimum duration or longer than the maximum duration. In other embodiments, while the artist is not precluded from inhabiting the companion avatar instance for a duration shorter than the minimum duration or longer than the maximum duration, the virtual world application is configured to output alerts to the artist that the minimum and/or maximum durations may not be met. In such embodiments, the artist may follow or disregard the alert as appropriate.

Assume that the artist opts to populate the companion avatar instance of user Amy Brown, by activating the "populate selected companion" command when Amy Brown is selected. In one embodiment, the companion avatar $108_1$ switches from NPC mode to artist mode, as shown by the mode indicator 508 in the GUI screen 580. Once the companion avatar $108_1$ is in artist mode, the artist may in real-time interact with Amy Brown and other users having player avatars in the vicinity in the virtual world. Further, artist-mode perks become available, while the NPC-mode perks may also remain active and optionally enhanced. Accordingly, embodiments disclosed herein may facilitate social interactions between players themselves and between players and artists, while also providing additional gameplay aspects specific to the artists represented. Consequently, the immersive aspects of the virtual environments may be improved while also providing a platform for fan interaction, brand development, and product marketing for artists. For example, in a particular embodiment, users of player avatars may take snapshots or digital audio and/or video recordings of artist appearances in the virtual environment and circulate the snapshots and digital recordings through social media, thereby increasing the profile of the virtual environment and of the artist. In this regard, the snapshots and digital recordings may be tagged with the artist when circulated through one or more designated social media applications, and the tagging also may occur automatically in some embodiments based on one or more predefined content tagging rules.

Although embodiments are described herein in conjunction with providing companion avatars representing artists of audio content, other embodiments are broadly contemplated. For instance, in some embodiments, companion avatars may be provided to represent actors and/or directors of movies, artists of graphical content, authors of books or electronic books (e-books), dancers, photographers, sculptors, architects, and so on, based on profile information of the user indicating content currently or recently enjoyed by the user, where the profile information may be specified by the user or, upon authorization by the user, retrieved from a user profile maintained by the user on a social media application. In such embodiments, the companion avatar may provide commentary pertaining to aspects such as inspiration behind a specific chapter in a book, mechanics of materials used when creating a painting or taking a photograph, etc. In some embodiments, a companion avatar may spawn additional, character avatars to provide background to a story enjoyed by the user, including one of a main character from the story, who can relay background information of the story to the user.

Figure 6:
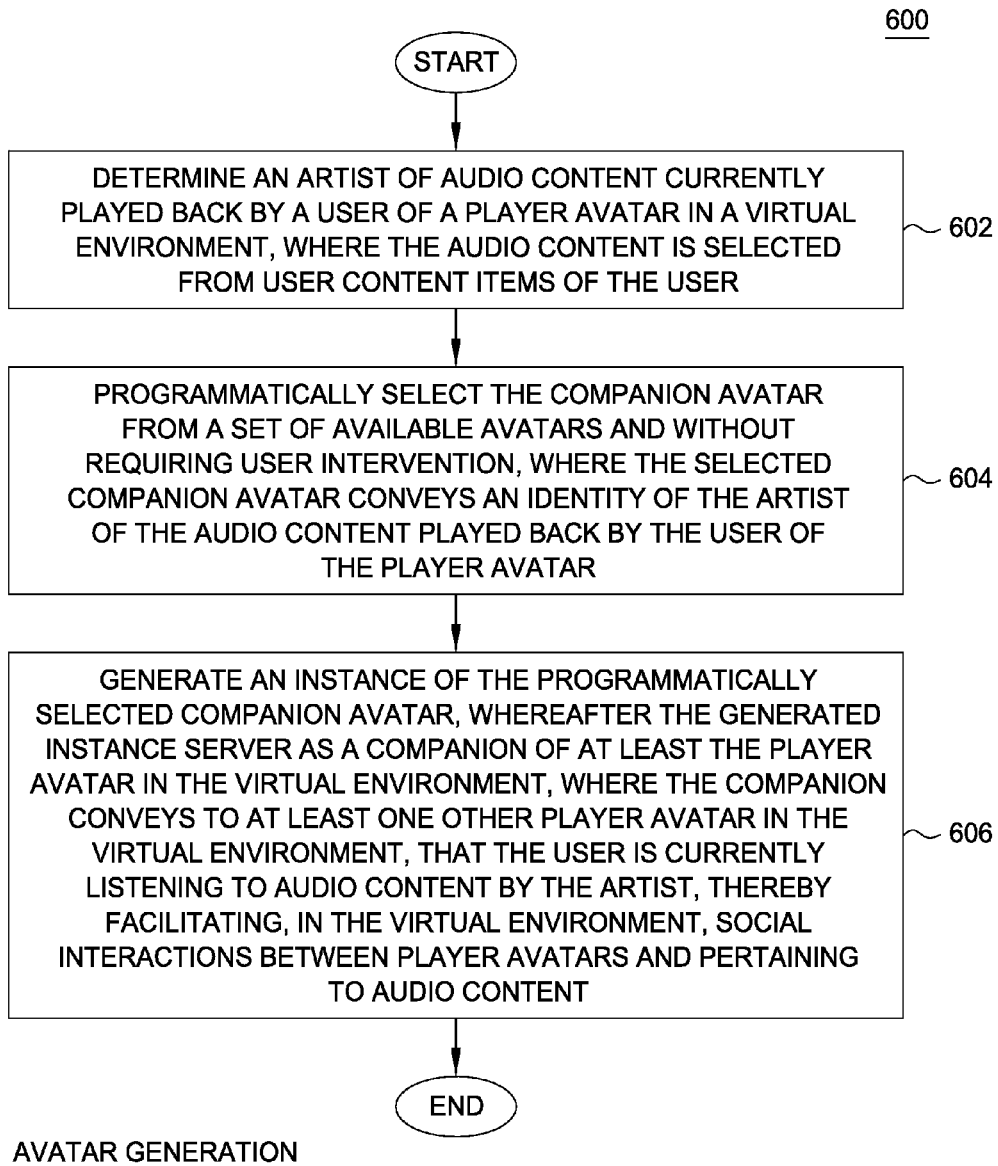
FIG. 6 is a flowchart depicting a method to facilitate social interactions in a virtual environment and based on companion avatars, according to one embodiment presented in this disclosure.

FIG. 6 is a flowchart depicting a method 600 to facilitate social interactions in a virtual environment and based on companion avatars, according to one embodiment presented in this disclosure. As shown, the method 600 begins at step 602, where the virtual world application 102 determines an artist of audio content currently played back by a user of a player avatar in the virtual environment, where the audio content is selected from user content items of the user. At step 604, the virtual world application 102 programmatically selects the companion avatar from a set of available avatars and without requiring user intervention, where the selected companion avatar conveys an identity of the artist of the audio content played back by the user of the player avatar. At step 606, the virtual world application 102 generates an instance of the programmatically selected companion avatar. The generated instance may be assigned to or associated with the player avatar. The generated instance, which is output for display, serves as a companion for at least the player avatar in the virtual environment. The companion is configured to interact with at least the player avatar in the virtual environment. The companion conveys to at least one other player avatar in the virtual environment, that the user is currently listening to audio content by the artist, thereby facilitating social iterations in the virtual environment and pertaining to the audio content at least in some cases.

Figure 7:
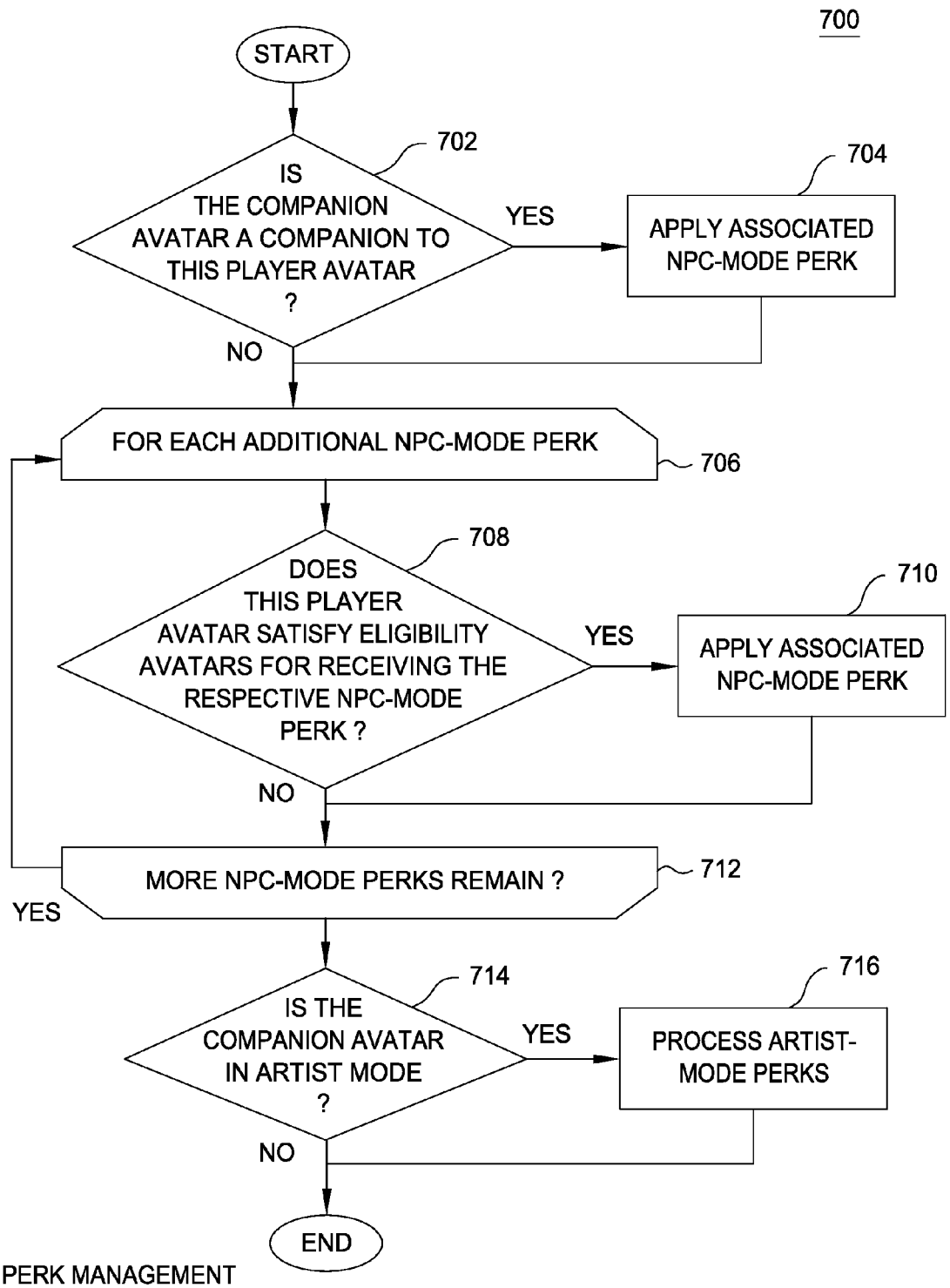
FIG. 7 is a flowchart depicting a method for managing perks associated with companion avatars in a virtual environment, according to one embodiment presented in this disclosure.

FIG. 7 is a flowchart depicting a method 700 for managing perks associated with companion avatars in a virtual environment, according to one embodiment presented in this disclosure. To this end, the method 700 may be performed for each of a set of player avatars desired to be evaluated for purposes of applying perks thereto. As shown, the method 700 begins at step 702, where the virtual world application 102 determines whether the companion avatar is a companion to a current player avatar under evaluation. If so, then at step 704, the virtual world application 704 applies an associated NPC-mode perk to the current player avatar. At step 706, the method 700 enters a loop to process each additional NPC-mode perk. At step 708, the virtual world application 102 determines whether the current player avatar satisfies eligibility criteria for receiving the NPC-mode perk. If so, then at step 710, the virtual world application 102 applies the associated NPC-mode perk to the current player avatar.

At step 712, the virtual world application 102 determines whether more NPC-mode perks remain to be processed. If so, the method 700 returns to the step 706 to process a next NPC-mode perk. Otherwise, then at step 714, the virtual world application 102 determines whether the companion avatar is in artist mode. If so, then at step 716, the virtual world application 102 processes artist-mode perks. To that end, the virtual world application 102 may perform the steps of 702 to 712 modified to evaluate and apply artist-mode perks rather than NPC-mode perks. Consequently, when the companion avatar is in artist mode, both NPC-mode perks and artist-mode perks are applied to eligible player avatars. In some embodiments, NPC-mode perks may be magnified or otherwise altered when the companion avatar is in artist mode. In alternative embodiments, however, NPC-mode perks are not applied when the companion avatar is in artist mode.

In one embodiment, the virtual environment includes environment content items specific to the virtual environment and not specific to any user of the virtual environment. In some cases, the plurality of environment content items and the player content items do not have any content item in common, and the player content items are not specific to the virtual environment. In one embodiment, the soundtrack is, in respective instances, played back by the user via each application selected from: (i) a virtual world application providing the virtual environment; and (ii) a media player application separate from and external to the virtual world application. The virtual world application and the media player application are configured to execute in an operating system (OS) environment of a computer local to the user of the player avatar. In some embodiments, the media player application executes on an a different computer or computing device.

In one embodiment, the instance of the programmatically selected companion avatar affects, in respective instances: (i) only cosmetic aspects of the virtual environment other than the instance itself; (ii) only gameplay aspects of the virtual environment, including, in respective instances, a virtual item of the user and a virtual item of the instance; and (iii) both cosmetic and gameplay aspects of the virtual environment. Further, the instance, in respective instances: (i) conveys, to the at least one user, the audio content being played back; and (ii) does not convey, to at least one other user of another avatar, the audio content being played back. The virtual environment includes, for each of a set of distinct artists including the determined artist, a respective set of instances of the respective artist, of which each instance serves as a companion to a respective, distinct player avatar in the virtual environment.

As described above, in one embodiment, each instance has a plurality of modes including an NPC mode and an artist mode. Each instance is, at least partially in time, in the NPC mode. In the NPC mode, the respective instance is not under control by any artist and does not convey the desired instance as being controlled by any artist. In a particular embodiment, a given instance of a given avatar is terminated upon the respective player avatar ceasing listening to audio content by the given avatar.

In one embodiment, the virtual world application 102 is configured to set a selected instance to an artist mode. In the artist mode, the selected instance is controlled based on input from the artist. Further, in the artist mode, the desired instance conveys to the at least one user that the selected instance is being controlled by the artist. Doing so may facilitate artist-user interaction in the virtual environment at least in some cases.

In one embodiment, the selected instance is, in respective instances: (i) selected based at least in part on artist input and (ii) programmatically selected without any artist input. In some embodiments, the virtual world application 102 is further configured to generate a graphical user interface (GUI) that includes information pertaining to the instances of the artist. The GUI is output to the artist to facilitate the artist monitoring the plurality of instances of the artist. The virtual world application 102 is further configured to receive, from the artist, a request to assume control of the instance selected by the artist from among the plurality of instances, and the selected instance is set to the artist mode responsive to the request.

In one embodiment, the virtual world application 102 is configured to, in a second instance, programmatically selecting the instance from among the instances and based on a set of user selection criteria. In some embodiments, the set of user selection criteria specifies that users having a larger collection of content items by a given artist have a higher likelihood of being programmatically selected. In a particular embodiment, the likelihood of a given user being programmatically selected is a function of a size of the collection of content items of the given user.

In one embodiment, each instance of conveying comprises visually conveying, and each instance, when in the artist mode, is visually distinct than when in the NPC mode. In one embodiment, the artist-user interaction includes, in respective instances, audio chat, text chat, video chat, and content sharing. The content sharing includes exclusive audio content from the artist, and the exclusive audio content is not included in the plurality of user content items of any user of the virtual environment. At least in some embodiments, the artist assumes control of a subset, less than the entirety, of the plurality of instances, in sequence.

In one embodiment, the information pertaining to each instance of the artist includes, for the respective instance, player avatar information pertaining to the player avatar to which the respective instance is companion. The information also includes user information of the player avatar. The information also includes virtual environment location information of at least one of the player avatar and the respective instance. The information further includes information pertaining to a subset of content items of the user, which subset of content items are by the artist.

In one embodiment, one or more avatars in the virtual environment, other than the avatar, satisfy a first proximity threshold pertaining to the instance of the artist in the virtual environment when the instance is in NPC mode. Such avatars are then permitted to access at least a second gameplay aspect. In some embodiments, the second gameplay aspect is not otherwise accessible when the one or more avatars do not satisfy the first proximity threshold pertaining to the instance of the artist in the virtual environment. At least in some embodiments, this occurs despite the instance not being companion to any of the one or more avatars. Doing so may thereby encourage instance-user interaction in the virtual environment at least in some cases. In some embodiments, the instance may also convey that the instance is companion to the avatar and not to any other avatar in the virtual environment.

In one embodiment, one or more avatars in the virtual environment, other than the avatar, satisfy a second proximity threshold pertaining to the instance of the artist in the virtual environment when the instance is in artist mode. Such avatars are then permitted to access at least a third gameplay aspect. In some embodiments, the third gameplay aspect is not otherwise accessible when the one or more avatars do not satisfy the second proximity threshold pertaining to the instance of the artist in the virtual environment. At least in some embodiments, this occurs despite the instance not being companion to any of the one or more avatars. Doing so may thereby encourage artist-user interaction in the virtual environment at least in some cases.

At least in some embodiments, the first, second and third gameplay aspects are distinct gameplay aspects with successively greater influence on the virtual environment. Further, the second proximity threshold is higher than the first proximity threshold. Further still, synchronized playback of audio content by the artist is provided for the respective user of each avatar satisfying the second proximity threshold measured relative to the instance of the artist in the virtual environment when the instance is in artist mode. In some embodiments, in respective instances and without requiring user intervention: (i) an audio recording and (ii) a video recording of the synchronized playback is stored and transmitted for publishing via a designated social media application. In some embodiments, the companion avatar serves, in respective instances: (i) as companion only to the user; and (ii) as companion to multiple users currently playing back audio content by the artist, the multiple users including the user.

Figure 8:
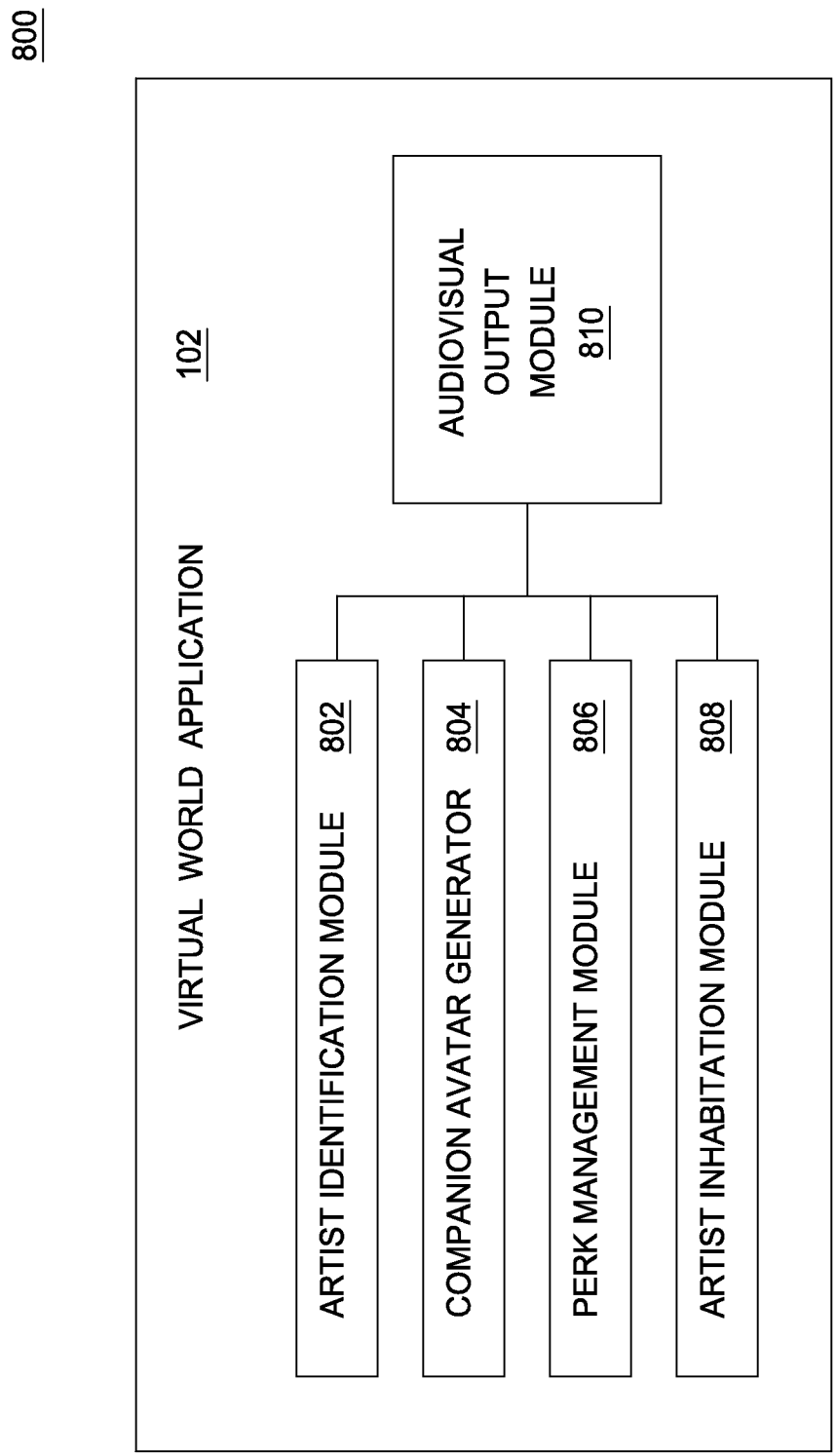
FIG. 8 is a block diagram illustrating components of the application configured to reflect status in a virtual environment, according to one embodiment presented in this disclosure.

FIG. 8 is a block diagram illustrating components 800 of the virtual world application 102 of FIG. 1, according to one embodiment presented in this disclosure. As shown, the components 800 include an artist identification module 802, a companion avatar generator 804, a perk management module 806, an artist inhabitation module 808, and an audiovisual output module 810. Those skilled in the art will recognize that the components 800 of the virtual world application 102 are merely exemplary, and other ways of implementing the virtual world application 102 are broadly contemplated in the present disclosure.

In one embodiment, the artist identification module 802 is configured to identify artists based on audio content currently played back by users of player avatars in the virtual environment. The companion avatar generator 804 is configured to generate, for the player avatars, instances of companion avatars based on the identified artists. The perk management module 806 is configured to apply perks to eligible player avatars proximate to the companion avatars or otherwise satisfying eligibility criteria for receiving the perks. The companion avatars convey to other player avatars in the virtual environment that the user of the player avatar is currently listening to audio content by the artist. The artist inhabitation module 808 is configured to permit an artist to control desired instances of companion avatars in the virtual world. Doing so not only permits the artist to interact with players in the virtual environment but may also enhance existing perks and/or unlock additional perks for eligible players. The audiovisual output module 810 is configured to output instances of companion avatars and associated audio and/or visual aspects of associated perks. In some embodiments, the audiovisual output module 810 is also configured to output indications of area of effect of the associated perks. Configuring the virtual world application 102 according to the techniques disclosed herein may facilitate social interactions in the virtual environment and thereby improve the user experience associated with the virtual environment at least in some cases.

Figure 9:
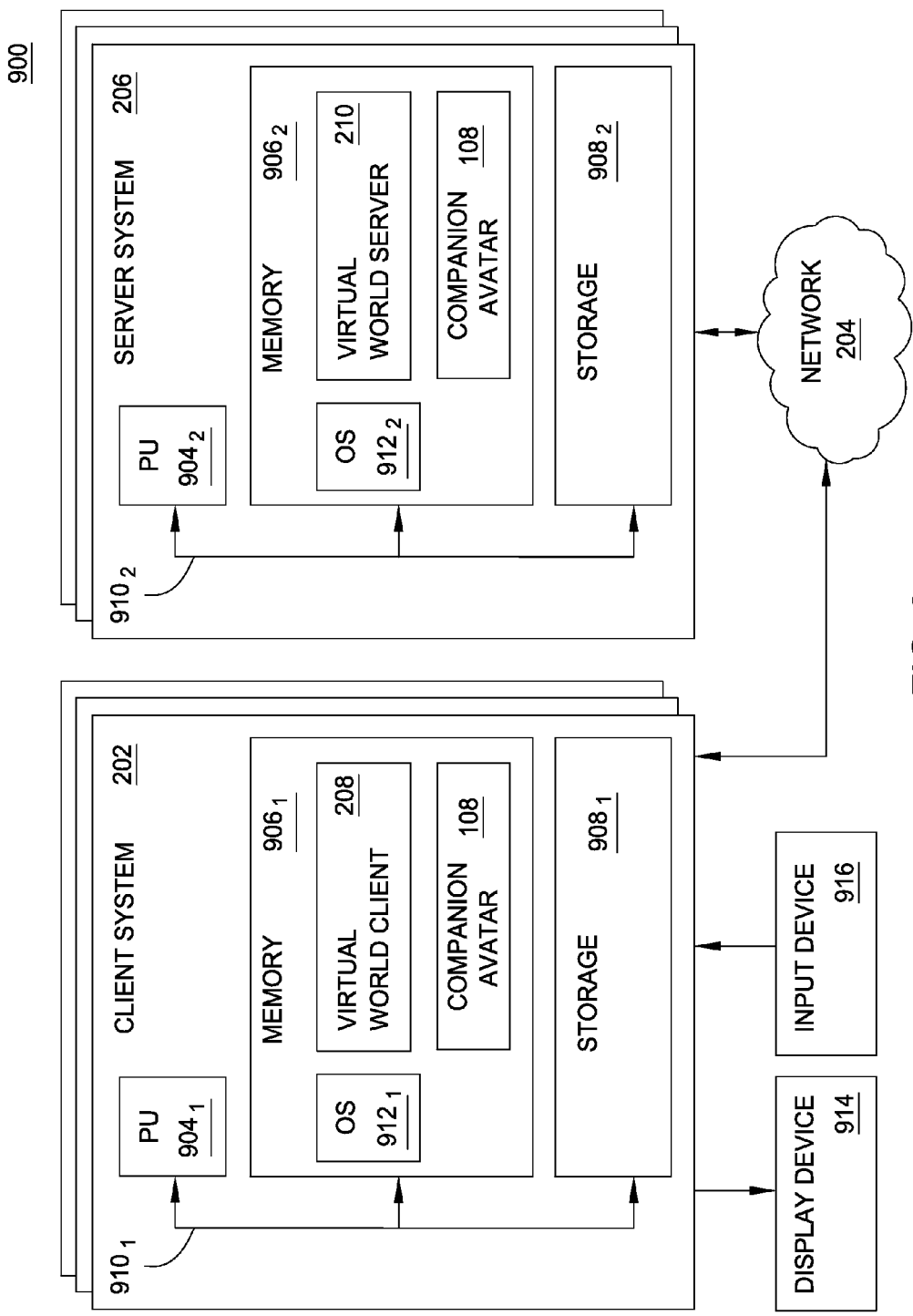
FIG. 9 is a block diagram illustrating a networked system configured to reflect status in a virtual environment, according to one embodiment presented in this disclosure.

FIG. 9 is a block diagram illustrating a networked system 900 configured to reflect status in a virtual environment, according to one embodiment presented in this disclosure. The networked system 900 corresponds to the networked system 200 of FIG. 2. As shown, the system 900 includes a plurality of client systems 202 and a plurality of server systems 206, communicatively coupled via the network 204.

In one embodiment, the client systems 202 may include existing computer systems, e.g., desktop computers, server computers, laptop computers, tablet computers, gaming consoles, hand-held gaming devices and the like. The client systems 202 illustrated in FIG. 9, however, are merely examples of computer systems in which embodiments disclosed herein may be used. Embodiments disclosed herein may be implemented differently, regardless of whether the computer systems are complex multi-user computing systems, such as a cluster of individual computers connected by a high-speed network, single-user workstations, or network appliances lacking non-volatile storage. Moreover, it is explicitly contemplated that embodiments disclosed herein may be implemented using any device or computer system capable of performing the functions described herein.

As shown, each client system 202 and server system 206 includes, without limitation, a processor 904, which obtains instructions and data via a bus 910 from a memory 906 and storage 908. The processor 904 is a programmable logic device that performs instruction, logic, and mathematical processing, and may be representative of one or more CPUs. The memory 906 is any memory sufficiently large to hold the necessary programs and data structures. The memory 906 could be one or a combination of memory devices, including Random Access Memory, nonvolatile or backup memory (e.g., programmable or Flash memories, read-only memories, etc.).

As shown, the memory 906 includes an operating system ("OS") 912. Operating system 912 is software used for managing the operation of the client system 202 or the server system 206. Examples of the OS 912 include UNIX, versions of the Microsoft Windows® operating system and distributions of the Linux® operating system. Additional examples of the OS 912 include custom operating systems for gaming consoles, including the custom operating systems for systems such as the Microsoft Xbox 360®, Nintendo WHO and Sony PlayStation® 3 as described above. As shown, the memory $906_1$ of the client system 202 further includes the virtual world client 208 and the companion avatar 108. The memory $906_2$ of the server system 206 further includes the virtual world server 210 and the companion avatar 108.

The storage 908 is representative of hard-disk drives, flash memory devices, optical media and the like. Generally, the storage 908 stores application programs and data for use by the client systems 202. In addition, the memory 906 and the storage 908 may be considered to include memory physically located elsewhere; for example, on another computer coupled to the client system 202 or to the server system 206 via the bus 910. The client systems 202 and the server systems 206 are operably connected to the network 204, e.g., via network interfaces.

Additionally, the client systems 202 each are coupled to display devices 914 and input devices 916, respectively. The display devices 914 may include output devices such as monitors, touch screen displays, and so on. For instance, the display devices 914 may include a display device used to visually depict a virtual environment. As an example, the display 914 may provide a touch sensitive surface allowing the user to select different locations within the virtual environment and control the movement of an avatar within the virtual environment. The input devices 916 represent a wide variety of input devices, including keyboards, mice, controllers, and so on. Furthermore, the input devices 916 may include a set of buttons, switches or other physical device mechanisms for controlling the client system 202. For example, the input devices 916 could include a set of directional buttons used to navigate an avatar through a virtual environment presented on the display 914.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects disclosed herein may take the form of an entirely hardware embodiment, an entirely software embodiment (including firmware, resident software, micro-code, etc.) or an embodiment combining software and hardware aspects that may all generally be referred to herein as a "circuit," "module" or "system."

Embodiments presented in this disclosure may be a system, a method, and/or a computer program product. The computer program product may include a computer readable storage medium (or media) having computer readable program instructions thereon for causing a processor to carry out aspects presented in this disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of disclosed embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented in this disclosure.

Aspects herein are described with reference to flowchart illustrations and/or block diagrams of methods, apparatus (systems), and computer program products according to disclosed embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications (e.g., the virtual world server 210) or related data available in the cloud. For example, the virtual world server 210 could execute on a computing system in the cloud and manage companion avatars and perks associated therewith. Social interactions between player avatars and pertaining to audio content may thereby be facilitated.

The flowchart and block diagrams in the Figures illustrate the architecture, functionality, and operation of possible implementations of systems, methods, and computer program products according to various embodiments presented in this disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments presented in this disclosure, other and further embodiments may be devised without departing from the basic scope of contemplated embodiments, and the scope thereof is determined by the claims that follow.

What is claimed is:

1. A computer-implemented method to alter gameplay elements based on proximity to audio artist avatars in a virtual environment, the computer-implemented method comprising:

retrieving an indication of an artist associated with audio content being played by a first user controlling a first player avatar in the virtual environment;

generating a companion avatar providing a virtual representation of the artist of the audio content;

assigning the companion avatar to the first player avatar in the virtual environment, whereafter the companion avatar is configured to interact with the first player avatar, wherein presence of the companion avatar conveys to one or more other users interacting within the virtual environment that the first user is currently listening to audio content of the artist; and granting, by operation of one or more computer processors, to a second player avatar satisfying a first proximity threshold pertaining to the companion avatar, a first gameplay perk inaccessible when the first proximity threshold is not met.

2. The computer-implemented method of claim 1, wherein the companion avatar has an associated plurality of modes including a non-player character (NPC) mode and an artist mode.

3. The computer-implemented method of claim 1, further comprising:

responsive to receiving an authenticated request from the artist to take control of the companion avatar, introducing the companion avatar to the virtual environment in an artist mode, in which mode the companion avatar is controlled based on input from the artist.

4. The computer-implemented method of claim 1, further comprising:

introducing the companion avatar to the virtual environment in a non-player character (NPC) mode, in which mode the companion avatar is controlled by the virtual environment.

5. The computer-implemented method of claim 1, wherein the artist assumes control of a plurality of companion avatars representing the artist, in succession.

6. The computer-implemented method of claim 1, wherein the companion avatar further conveys, to the one or more other users, the audio content being played by the first user, wherein the companion avatar affects, in respective instances: (i) only cosmetic aspects of the virtual environment other than the companion avatar itself; (ii) only gameplay perks of the virtual environment, including a virtual item present in the virtual environment; and (iii) both cosmetic and gameplay perks of the virtual environment.

7. The computer-implemented method of claim 6, wherein a subset, less than the entirety, of a set of available companion avatars representing the artist is selected based on a set of user selection criteria, wherein the set of available companion avatars includes the companion avatar.

8. The computer-implemented method of claim 7, wherein each companion avatar in the set of available companion avatars is associated with a different player avatar, wherein the set of user selection criteria specifies that users having a larger collection of content items by a given artist have a higher likelihood of being selected, wherein the likelihood of a given user being selected is a function of a size of the collection of content items of the given user.

9. The computer-implemented method of claim 8, wherein the companion avatar is output for display, wherein the companion avatar conveys an identity of the artist of the audio content, wherein the companion avatar has a plurality of modes including a non-player character (NPC) mode and an artist mode.

10. The computer-implemented method of claim 9, wherein the companion avatar is, at least partially in time, in the NPC mode, in which mode the companion avatar is not under control by any artist and does not convey itself as being controlled by any artist.

11. The computer-implemented method of claim 10, further comprising:
granting, to a third player avatar satisfying a second proximity threshold pertaining to the companion avatar, a second gameplay perk inaccessible when the second proximity threshold is not met; and
granting, to a fourth player avatar satisfying a third proximity threshold pertaining to the companion avatar when in NPC mode, a third gameplay perk inaccessible when the third proximity threshold is not met.

12. The computer-implemented method of claim 11, wherein the first, second, and third gameplay perks are distinct gameplay perks having successively greater measures of influence on gameplay in the virtual environment, thereby altering gameplay elements based on proximity to audio artist avatars in the virtual environment, wherein the second proximity threshold is higher than the first proximity threshold, wherein the third proximity threshold is higher than the second proximity threshold;
wherein each of the first, second, and third proximity thresholds is increased when the companion avatar is in artist mode and not when the companion avatar is in NPC mode;
wherein at least one of the first, second, and third gameplay is further scaled based on a total count of avatars satisfying a corresponding one of the first, second, and third proximity thresholds pertaining to the companion avatar when in NPC mode;
wherein the at least one of the first, second, and third gameplay perks is further scaled based on a total count of audio tracks of the artist owned by players of avatars satisfying a corresponding one of the first, second, and third proximity thresholds pertaining to the companion avatar when in NPC mode;
wherein in respective instances: (i) the first, second, and third gameplay are only granted when the companion avatar is in NPC mode and not when the companion avatar is in artist mode; and (ii) the first, second, and third gameplay are granted in both NPC and artist modes.

13. The computer-implemented method of claim 12, further comprising:
respectively granting the second, third, and fourth players first, second, and third physical aspects, respectively, when the respective player satisfies a respective one of the first, second, and third proximity thresholds pertaining to the companion avatar when in artist mode, each physical aspect permitting the respective player to purchase an exclusive, physical item associated with the artist;
wherein the first, second, and third physical aspects are only granted when the companion avatar is in artist mode and not when the companion avatar is in NPC mode;
wherein at least one of the first, second, and third gameplay perks, when still being granted in artist mode, is further scaled when the companion avatar is in artist mode.

14. The computer-implemented method of claim 13, wherein the audio content is selected from a plurality of user content items of the user, wherein the companion avatar conveys an identity of the artist of the audio content, wherein the companion avatar is programmatically selected from a plurality of available companion avatars and without requiring user intervention, wherein the computer-implemented method further comprises:
prior to retrieving the indication of the artist, identifying the audio content based on a predefined digital audio fingerprinting technique;
granting, to the first player avatar, a fourth gameplay perk accessible only by a designated avatar that the companion avatar is assigned to, the designated avatar consisting of the first player avatar, wherein the fourth gameplay perk is inaccessible by the second, third, and fourth players regardless of their proximity to the companion avatar; and
for each of the first, second, third, and fourth gameplay aspects perks, outputting an indication that the respective gameplay perk is granted.

15. The computer-implemented method of claim 14, thereby facilitating, in the virtual environment, social interactions between player avatars and pertaining to audio content, wherein the virtual environment includes a plurality of environment content items specific to the virtual environment and not specific to any user of the virtual environment.

16. The computer-implemented method of claim 15, wherein the plurality of environment content items and the plurality of player content items do not have any content item in common, wherein the plurality of player content items are not specific to the virtual environment.

17. The computer-implemented method of claim 16, wherein the soundtrack is, in respective instances, played back by the user via each application selected from: (i) a virtual world application providing the virtual environment; and (ii) a media player application separate from and external to the virtual world application.

18. The computer-implemented method of claim 17, wherein the virtual world application and the media player application are configured to execute in an operating system (OS) environment of a computer local to the user of the player avatar.

19. The computer-implemented method of claim 18, wherein the companion avatar is, in respective instances: (i) selected based at least in part on artist input and (ii) programmatically selected without any artist input.

20. The computer-implemented method of claim 19, further comprising, in a first instance:
generating a graphical user interface (GUI) that includes information pertaining to the subset of available companion avatars, wherein the GUI is output to the artist to facilitate the artist monitoring the subset of available companion avatars;
wherein the virtual world application comprises a plurality of components including an artist identification module, a companion avatar generator, a perk management module, an artist inhabitation module, and an audiovisual output module;
wherein the artist identification module is configured to identify the audio content based on the predefined digital audio fingerprinting technique;
wherein the companion avatar generator is configured to generate the companion avatar providing the virtual representation of the artist of the audio content;
wherein the perk management module is configured to grant the first, second, and third gameplay based on the first, second, and third proximity thresholds;
wherein the artist inhabitation module is configured to introduce the companion avatar to the virtual environment in the artist mode, in which mode the companion avatar is controlled based on input from the artist;

wherein the audiovisual output module is configured to output the GUI that includes information pertaining to the subset of available companion avatars.

* * * * *